(12) United States Patent
Ratcliff

(10) Patent No.: US 11,932,069 B2
(45) Date of Patent: Mar. 19, 2024

(54) MULTIPLE STACKED AIRBAG SPRING

(71) Applicant: Universal Air, Inc., San Bernardino, CA (US)

(72) Inventor: Daniel Zachary Ratcliff, Brea, CA (US)

(73) Assignee: UNIVERSAL AIR, INC., San Bernardino, CA (US)

( * ) Notice: Subject to any disclaimer, the term of this patent is extended or adjusted under 35 U.S.C. 154(b) by 0 days.

(21) Appl. No.: 17/662,262

(22) Filed: May 6, 2022

(65) Prior Publication Data

US 2023/0356555 A1    Nov. 9, 2023

(51) Int. Cl.
*B60G 17/015* (2006.01)
*B60G 11/27* (2006.01)

(52) U.S. Cl.
CPC .......... *B60G 17/0155* (2013.01); *B60G 11/27* (2013.01); *B60G 2500/2022* (2013.01); *B60G 2500/203* (2013.01); *B60G 2500/204* (2013.01)

(58) Field of Classification Search
CPC ............... B60G 17/0155; B60G 11/27; B60G 2500/2022; B60G 2500/203; B60G 2500/204
See application file for complete search history.

(56) References Cited

U.S. PATENT DOCUMENTS

| 4,783,096 A | 11/1988 | Ramsey | |
|---|---|---|---|
| 5,346,246 A | 9/1994 | Lander | |
| 6,386,525 B1 | 5/2002 | Stuart | |
| 7,959,174 B2 | 6/2011 | Mullican | |
| 8,672,335 B2 * | 3/2014 | Khajepour | B60G 21/073 280/5.514 |
| 8,967,648 B2 * | 3/2015 | Peterson | F16F 9/057 280/5.514 |
| 10,005,499 B2 * | 6/2018 | Brewer | B60G 99/002 |
| 2010/0230913 A1 * | 9/2010 | Peterson | F16F 9/057 280/5.503 |
| 2022/0105767 A1 * | 4/2022 | Short | A01C 23/047 |

FOREIGN PATENT DOCUMENTS

| CN | 2811664 Y | | 8/2006 |
|---|---|---|---|
| CN | 104675916 A | * | 6/2015 |
| CN | 104675916 A | | 6/2015 |

OTHER PUBLICATIONS

CN-104675916-A English machine translation (Year: 2015).*
CN-104675916-A Machine English translation (Year: 2015).*

* cited by examiner

*Primary Examiner* — Jason D Shanske
*Assistant Examiner* — Matthew James O'Neill
(74) *Attorney, Agent, or Firm* — KOS IP Law LLP

(57) ABSTRACT

A suspension system for a vehicle is shown. The suspension system may have first and second airbags stacked upon each other. By adjusting a height difference between the first and second airbags while maintaining the same collective height of the first and second airbags, the spring rate of the collective first and second airbags are changed while maintaining the same collective height of the first and second airbags.

6 Claims, 7 Drawing Sheets

MULTIPLE STACKED AIRBAG SPRING

STATEMENT RE: FEDERALLY SPONSORED RESEARCH/DEVELOPMENT

Not Applicable.

BACKGROUND

The various aspects and embodiments described herein relate to a multiple stacked airbag spring.

A suspension system of a vehicle determines a ride frequency of the vehicle. Certain disadvantages exist for vehicular suspension systems.

Accordingly, there is a need in the art for an improved vehicle suspension system.

BRIEF SUMMARY

Various aspects of a multiple stacked airbag spring are discussed herein. The multiple stacked airbag spring may have first and second airbag springs. The first and second airbag springs may collectively define a spring rate of the multiple stacked airbag spring. The spring rate of the multiple stacked airbag spring may be adjusted to different values while keeping a height of the multiple stacked airbag spring the same. By way of example and not limitation, the spring rate of the multiple stacked airbag spring may have a first spring rate at a first height and a different spring rate at the first height. The first and second airbags may be stacked upon each other. In particular, the amount of air in the first airbag spring may be increased so that a height of the first airbag spring increases by X inches while the amount of air in the second airbag spring may be decreased so that a height of the second airbag spring decreases by X inches. In making this adjustment, the spring rates before and after the adjustments to the amount of air in the first and second airbag springs are different while the height of the multiple stacked airbag spring remains the same before and after the adjustments to the amount of air in the first and second airbag springs.

The spring rate of the multiple stacked airbag spring may be adjusted while maintaining the same height of the multiple stacked airbag spring in other ways. For example, only one of the first and second air springs can be selectively active as a spring while the other one of the first and second airbag spring is selectively locked out or bottomed out. Only the active one of the first and second airbag spring contributes to the spring rate of the multiple stacked airbag spring.

A spring which is adjustable to have first and second different spring rates at the same height is disclosed. The spring may comprise a first airbag spring, a second airbag spring, an air source, a manifold, a plurality of valves and a controller.

The first airbag spring may have a first non linear spring rate. The first airbag spring may define a first linear deflection axis wherein the first airbag is traversed along the first linear deflection axis between a first position under a first load and a second position under a second load.

The second airbag spring may have a second non linear spring rate. The second airbag spring may define a second linear deflection axis wherein the second airbag spring is traversed along the second linear deflection axis between a first position under the first load and a second position under the second load. The first and second linear deflection axes may be coaxially aligned.

The air source for providing compressed air to the first and second airbag springs is disclosed. The manifold may be in fluid communication with the first and second airbag springs and the air source for providing the compressed air to the first and second airbag springs.

The plurality of valves may be inline with the first and second airbag springs for providing the compressed air selectively to the first and second airbag springs.

The controller may be in communication or connected to the manifold and valves for opening and closing one or more of the plurality of valves for filling and releasing air from the first and second airbag springs.

A first height of the first airbag spring may be different from a first height of the second airbag spring. A second height of the first airbag spring may be different from the second height of the second airbag spring. The first height of the first airbag spring plus the first height of the second airbag may be equal to second height of the first airbag spring plus the second height of the second airbag spring.

At least one valve of the plurality of valves may be attached to the manifold and controlled by the controller from allowing air to be filled into at least one of the first and second airbag springs to increase a height of the at least one of the first and second airbag springs.

The valve may release air from at least one of the first and second airbag springs to decrease a height of the at least one of the first and second airbag springs.

First and second valves may be in communication with the first and second airbag springs for releasing air from the first and second valves to reduce a height of the spring.

In another aspect, a method of operating a spring to have different spring rates with the same height is disclosed. The method may comprise the steps of providing a spring, the spring being capable of an adjustable spring rate at the same height so that the spring has a first spring rate at a first height or adjustable to a second spring rate at the first height; filling the first airbag spring and the second airbag spring so that the first airbag spring has a height and the second airbag spring has a height, a height of the first airbag spring being different than a height of the second airbag spring, the height of the first airbag spring plus the height of the second airbag spring having a cumulative height; filling the first airbag spring and the second airbag spring so that the first airbag spring has a height and the second airbag spring has a height, a height of the first airbag spring being different than a height of the second airbag spring, the height of the first airbag spring plus the height of the second airbag spring having a cumulative height; adjusting an amount of air in the first and second airbag springs to adjust a spring rate of the spring while the cumulative height remains the same.

The spring disclosed in the method above may comprise a first airbag spring having a first non linear spring rate. The first airbag spring may define a first linear deflection axis wherein the first airbag is traversed along the first linear deflection axis between a first position under a first load and a second position under a second load. A second airbag spring may have a second non linear spring rate. The second airbag spring may define a second linear deflection axis. The first and second linear deflection axes may be coaxially aligned.

An air source provides compressed air to the first and second airbag springs. A manifold may be in fluid connection with the first and second airbag springs and the air source. A controller may be connected to the manifold and valves for filling and releasing air from the first and second airbag spring.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 3:
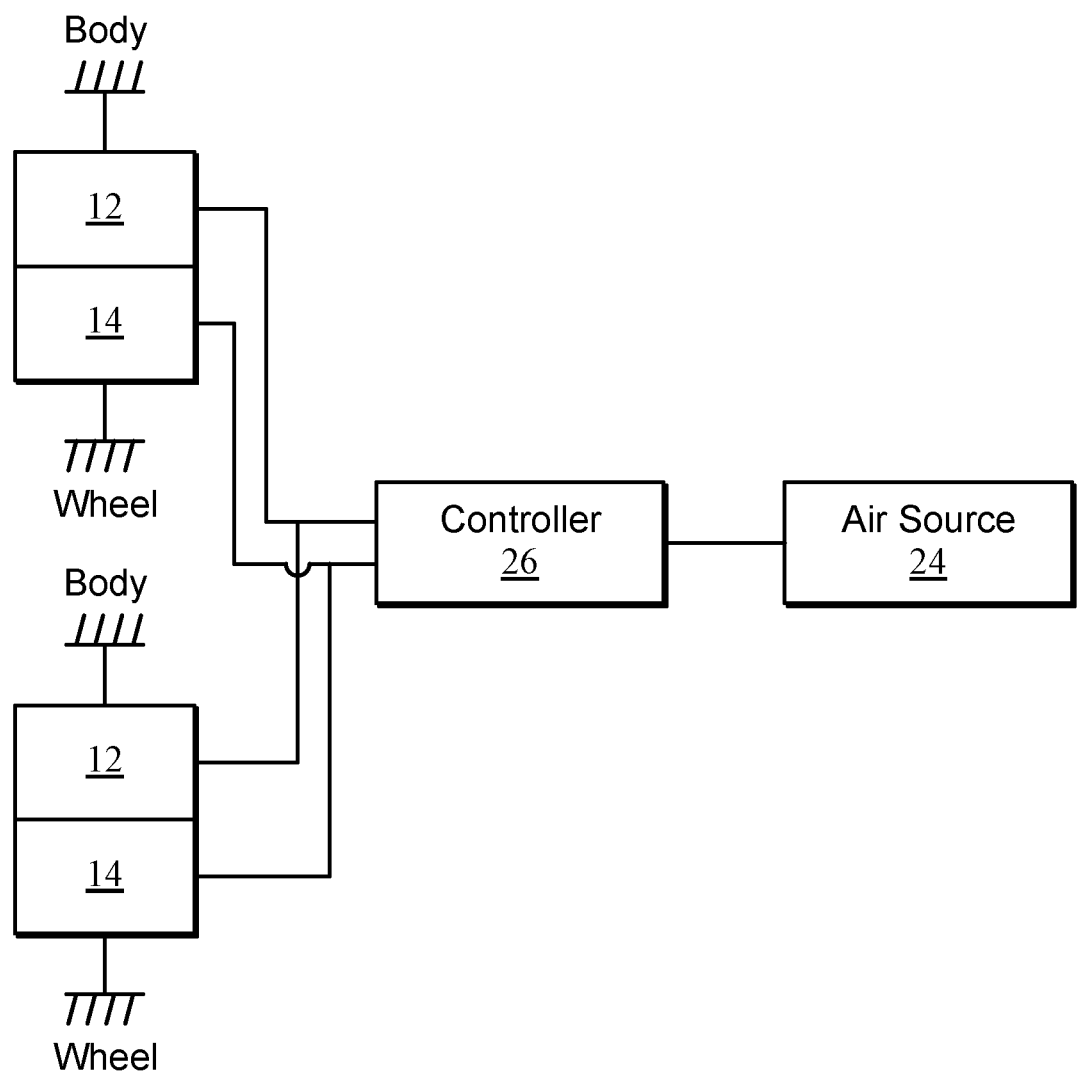
FIG. 3 is a schematic view of a branch of the suspension system shown in FIG. 1.

Referring now to the figures, a multiple stacked airbag spring 10 is shown in FIG. 3. The multiple stacked airbag spring 10 may have a first airbag 12 and a second airbag 14. The first and second airbags 12, 14 may be stacked upon each other so that a spring rate of the multiple stacked airbag spring 10 is a function of the spring rates of the first and second airbags 12, 14. Moreover, by increasing a height 16 (see FIG. 4) of the first airbag 12 while decreasing a height 18 (see FIG. 4) of the second airbag 14 the same amount, a spring rate of the multiple stack airbag spring 10 may be different before and after the height adjustments to the first and second airbags 12, 14 while the height 20 of the multiple stacked airbag spring 10 remains the same before and after the height adjustments to the first and second airbags 12, 14. FIG. 5 graphically illustrates how increasing and decreasing the heights 16, 18 of the first and second airbags 12, 14 while the sum of the heights 16, 18 of the first and second airbags 12, 14 is the same before and after the adjustment changes the spring rate of the multiple stacked airbag spring 10. For example, for a multiple stack airbag spring 10 having a height of 7 inches, the spring rate is different when the height 16 of the first airbag spring 12 is 1.5 inches and the height 18 of the second airbag spring 14 is 5.5 inches compared to when the height 16 of the first airbag spring 12 is 2 inches and the height 18 of the second airbag spring 14 is 5 inches. In the initial set up, the height difference between the heights 16, 18 of the first and second airbags 12, 14 is 4 inches. In contrast, the height difference between the heights 16, 18 of the first and second airbags 12, 14 is 3 inches. Referring to FIG. 5, as the height difference between the heights 16, 18 of the first and second airbags 12, 14 decreases, the spring rate of the multiple stacked airbag spring 10 also decreases.

Figure 1:
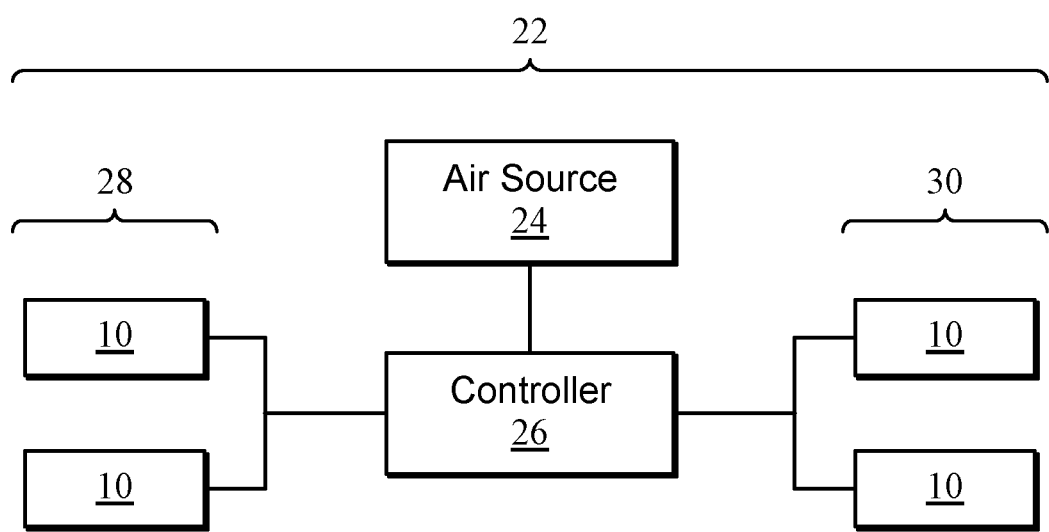
FIG. 1 is a schematic view of a first suspension system.
Figure 2:
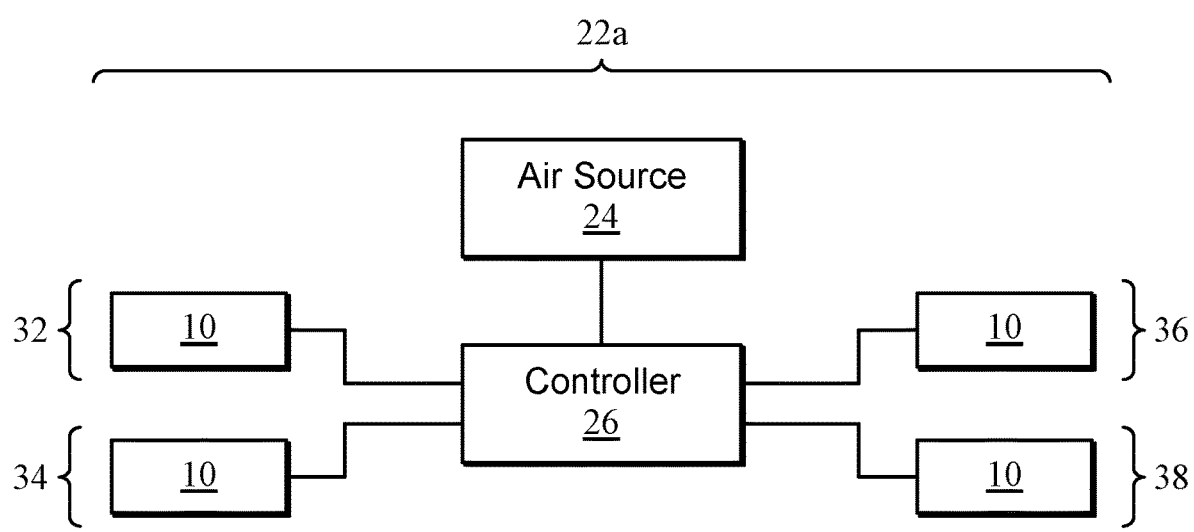
FIG. 2 is a schematic view of a second suspension system.

Referring now to FIGS. 1 and 2, a suspension system 22, 22a is shown. The suspension system 22 may have an air source 24, a controller 26 and a plurality of multiple stacked airbag springs 10. The suspension system 22 shown in FIG. 1 may have two branches 28, 30. The controller 26 adjusts and sets two of the multiple stacked airbag springs 10 to the same height and the same spring rate as each other. The controller 26 adjusts and sets the other two of the multiple stacked airbag spring 10 to the same height and the same spring rate as each other. The controller 26 adjusts the spring rate of each of the multiple stacked airbag spring 10 by adding or removing air into the stacked airbags 12, 14 of the multiple stacked airbag spring 10. The heights and the spring rate of the first pair of multiple stacked airbag springs 10 in the one of the branches 28 may be the same or different as the heights and the spring rate of the other or second pair of multiple stacked airbag springs 10 of the other branch 30.

In FIG. 2, the suspension system 22a is shown. Four branches 32, 34, 36, 38 are shown. The controller 26 and air source 24 may independently adjust each of the four branches 32, 34, 36, 38. Each of the branches 32, 34, 36, 38 has one multiple stacked airbag spring 10. For example, the left and right front or rear springs 10 of the vehicle may have different spring rates. For example, during cornering, the controller can adjust the spring rate of the spring on the outside wheels so that the vehicle corners better.

As described herein, the suspension system 10 is shown and described in relation to a four wheeled vehicle. However, it is also contemplated that the suspension system 10 may be utilized for a two wheeled vehicle or a device or mechanism that requires one or more multiple stacked airbag springs 10.

Referring now to FIG. 3, a single branch 28, 30 is shown. The controller 26 adds or removes air to the first airbags 12 on both sides so that the pressure and height is the same for both of the first airbags 12 in the same branch. Also, the controller 26 adds or removes air to the second airbag 14 so that the pressure and height is the same for both of the second airbags 14 in the same branch. When the controller 26 adds or removes air to the first airbags to increase or decrease a height 16 of the of the first airbag 12, the controller 26 also does the opposite to the second airbag 14 so as to remove or add air to the second airbags 14 to decrease or increase its height 18. In this way, the height 20 of the spring 10 remains the same while the spring rate of the spring 10 changes.

Referring now to FIG. 3, a single branch 28, 30 is shown. Each of the branches 28, 30 is individually controlled by the controller 26. For example, the first airbags 12 of each of the springs 10 is in one circuit so that each of the first airbags 12 have the same pressure and the same height 16. Also, the second airbags 14 of each of the springs 10 is in one circuit so that each of the second airbags 14 have the same pressure and the same height. Each multiple stacked airbag spring 10 in each branch 28, 30 can be set to the same pressure, and thus the same height.

Figure 3A:
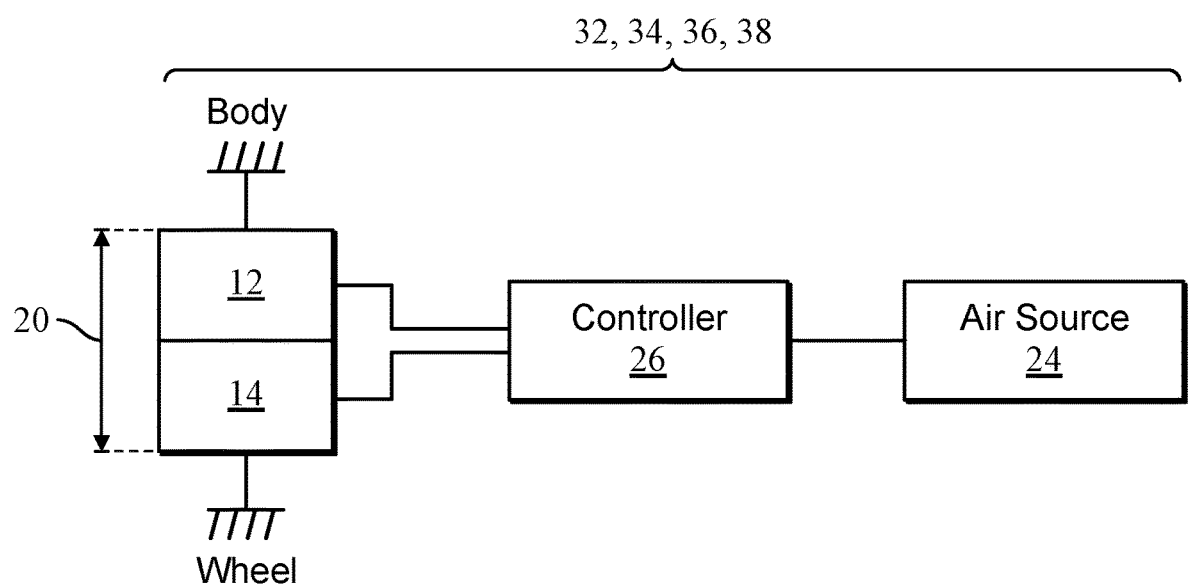
FIG. 3A is a schematic view of a branch of the suspension system shown in FIG. 2.

Referring now to FIG. 3A, each spring 10 is a branch 32, 34, 36, 38. The controller 26 can add or release air from the first and/or second airbags 12, 14 individually. In this regard, the spring rates and heights of each of the springs 10 can be individually adjusted independent from the other springs 10.

Figure 4:
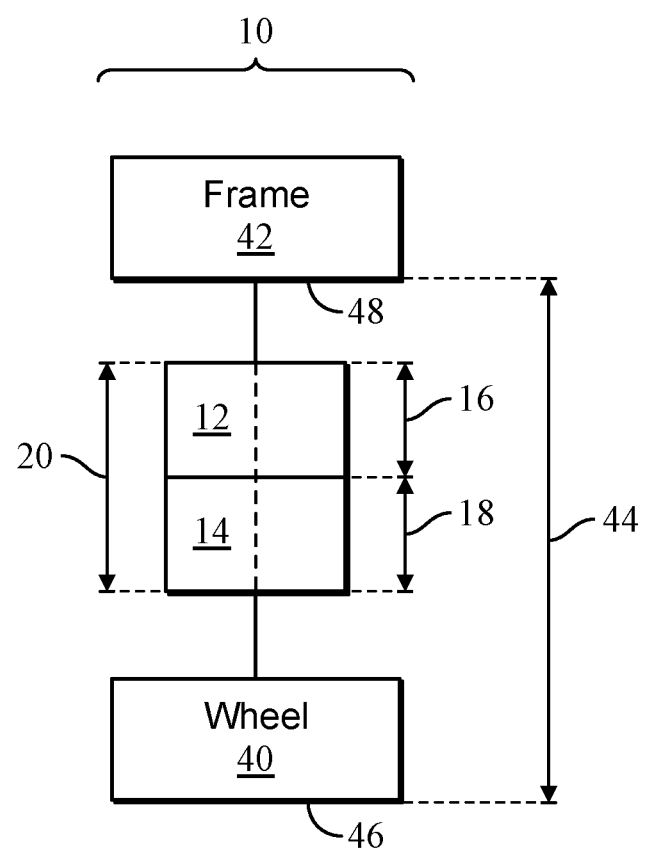
FIG. 4 is a schematic view of first and second airbags in a first position under load.
Figure 4A:
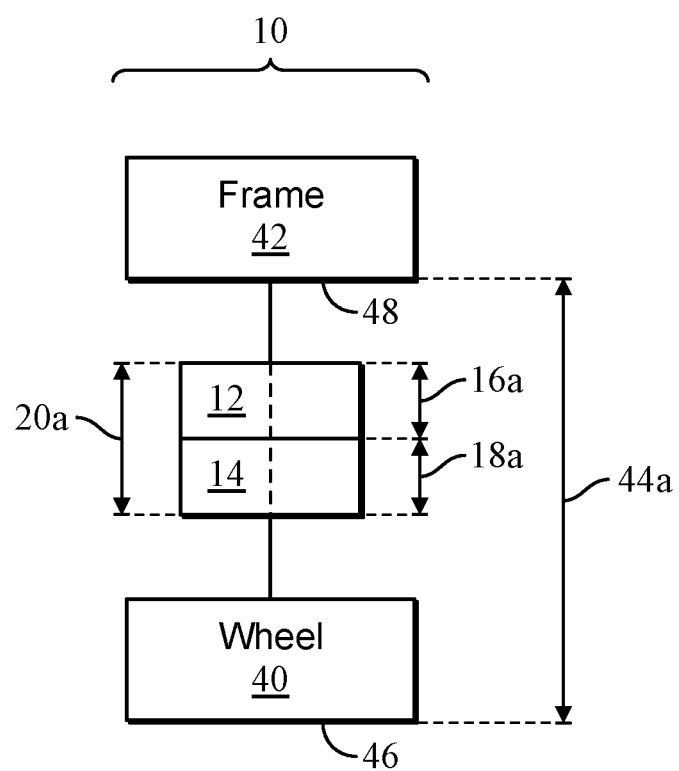
FIG. 4A is a schematic view of the first and second airbags in a second position under a heavier load compared to the load shown in FIG. 4.
Figure 5:
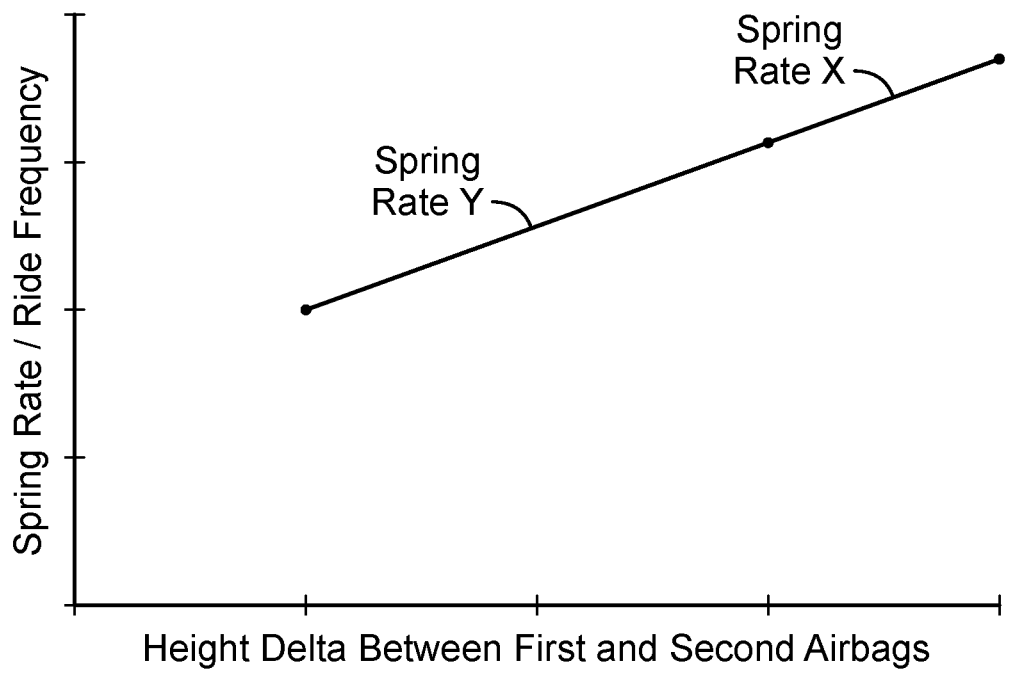
FIG. 5 is a graph illustrating a change in spring rate of a nonlinear spring as air is inserted and/or removed from first and second airbags of the spring.

Referring now to FIG. 4, a multi stacked airbag spring 10 is shown. The spring 10 is shown as having first and second airbags 12, 14. The first and second airbags 12, 14 are stacked upon each other. However, it is also contemplated that additional airbags may be stacked upon each other. As shown in FIGS. 4 and 4A, the first and second airbags 12, 14 may be traversed between a first load position and a second load position. The first load position is, for example, when an automobile is at rest. The spring 10 shown in FIG. 4 may represent the spring height 20 when the vehicle is at rest and the springs 10 are collectively supporting the weight of the vehicle. When the vehicle rolls over a bump, the wheel 40 will be pushed upward and the spring 10 will absorb the increased force from the wheel 40 movement. The spring 10 is compressed to a smaller height 20a, as shown in FIG. 4A. The springs 10 collectively support a weight of a vehicle.

Still referring to FIG. 4, the vehicle may be set to a ride height 44. For the purposes of discussing the various aspects of the suspension 22 and the spring 10 herein, the ride height 44 will be in reference to a lowest point of the wheel 40 (i.e., ground upon which the car is supported) and a lowest point of a frame of the vehicle. The vehicle can ride over a rock or obstacles less than the ride height without the obstacle contacting the frame of the vehicle. The ride height 44 may be lower for sportier cars and higher for off road cars. The ride height is directly related to a height 20 of the spring 20. For example, if the ride height 44 is 10 inches, the height 20 of the spring 10 may be 7 inches. If the height 20 of the spring 10 is increased one inch, then the ride height 44 increases by one inch to 11 inches. Conversely, if the height of the spring 10 is decreased by two inches, then the ride height 44 decreases by two inches to 8 inches.

In a first embodiment, the vehicle may have a constant ride height while the springs 10 are adjusted to have a different spring rate and as such different ride frequency, performance to match the terrain and experience. By increasing or decreasing the spring rate, the ride frequency of the vehicle can be adjusted. Typically, the ride frequency for a sportier experience is higher compared to the ride frequency for absorbing bumps in an uneven terrain.

For purposes of discussing the various aspects disclosed herein, it will be assumed that the spring rates for each of the springs 10 will be the same. However, it is also contemplated that the spring rate(s) for the front spring(s) 10 may be different from the spring rate(s) for the rear spring(s) 10. Also, it is contemplated that the spring rate(s) for each of the springs 10 may be different.

The vehicle may be set to have a first ride frequency which is associated with a first spring rate of the suspension. The vehicle will be set to a first ride height. By changing the heights 16, 18 of the first and second airbags 12, 14 while maintaining the same cumulative height 20 of the first and second airbags 12, 14, the spring rate, ride frequency of the spring 10 and vehicle may be changed while maintaining the ride height of the vehicle to the first ride height. For example, the height 16 of the first airbag 12 may be 1.5 inches and the height 18 of the second airbag 14 may be 5.5 inches. This produces a spring rate X, as shown in FIG. 5. The controller 26 can add air into the first airbag 12 so that the height 16 of the first airbag 12 is 2.5 inches and release air from the second airbag so that the height 18 of the second airbag 14 is 4.5 inches. The spring rate is identified as spring rate Y on FIG. 5. FIG. 5 shows the spring rates of the spring when the air is inserted or released from the first and second airbags while maintaining the height 20 of the spring 10.

The X axis of the graph shown in FIG. 5 is a difference (i.e., height delta between first and second airbags 12, 14) between the height 16 of the first airbag 12 and the height 18 of the second airbag. In the example above, the difference between the heights 16, 18 was 4 inches (5.5 inches minus 1.5 inches equals 4 inches). The height 20 of the spring 10 was 7 inches. The spring rate is represented by the data point at Spring Rate X shown in FIG. 5. After the controller 26 adjusts the amount of air in the first and second airbags 12, 14, the difference between the heights 16, 18 is 2 inches. The spring rate is represented by the data point at Spring Rate Y shown in FIG. 5. As shown as the difference in heights 16, 18 decreases, the spring rate decreases as well. But, as shown above, the height 20 remains the same.

The suspension system 22 may be incorporated into a vehicle. The vehicle may have one or more ride settings. A first ride setting may be a sport ride setting. A second ride setting may be an off road ride setting. To change between the two settings, the vehicle may have a switch labeled first ride setting and second ride setting. When the switch is set to the first ride setting, the controller 26 may set the amount of air in the first and second airbags to have a higher spring rate, and thus a sportier feel for the driver and passenger of the vehicle. This first ride setting may be used by the driver when the driver drives the vehicle in a city environment or an environment where the ground is flat. When the driver wants to drive the vehicle in a bumpier terrain, the driver can change the switch to the second ride setting. The controller 26 may set the amount of air in the first and second airbags 12, 14 so that the difference in heights 16, 18 of the first and second airbags 12, 14 is less than the difference in heights 16, 18 previously set but the ride height remains constant. One of the benefits of maintaining the ride height while changing the spring rate or ride frequency of the car is that the axle angles and other components of the vehicle remain within the stock parameters set by the automobile manufacturer. The safety sensors are all still operational and do not need to be adjusted when the ride height is adjusted.

The suspension system 22 may also be adjusted with sensors and without any human intervention. The vehicle may be equipped with an accelerometer, vibration sensors, gyroscope and other sensors for measuring ride experience of the driver and passenger. Based on inputs from the sensors, the controller 26 can adjust the spring rate(s) of the spring(s) to improve the ride experience of the driver and passenger(s). A processor can process the data received by the sensors. Based on the processed data, the processor can cause the controller to set the suspension system to a first ride setting or a second ride setting.

Other modes of operation of the suspension system 22 are also contemplated. Although the various aspects of the suspension 22 was discussed in relation to maintaining the same height 20 of the spring and changing the spring rate of the spring, it is also contemplated that the height 20 of the spring can be increased while also decreasing the spring rate. For example, the first ride setting may be associated with the first and second airbags 12, 14 having a first height 20 and a first spring rate. The second ride setting may be associated with the first and second airbags 12, 14 having a second height 20 and a second spring rate. The first height 20 may be lower than the second height 20 while the first spring rate is higher than the second spring rate.

The springs 10 discussed herein may have first and second airbags 12, 14 which each airbag has a non linear spring rate. Although airbags are discussed herein in relation to the suspension 22, it is also contemplated that any non linear spring may be implemented or replace the first and second airbags 12, 14.

Moreover, the springs 10 have been discussed in relation to airbags. However, it is also contemplated that the airbags may be gasbags wherein a gas other than air is utilized. Moreover, the airbags having a nonlinear spring rate may be replaced with a spring with a linear spring rate or a liquid based spring. The various aspects discussed herein are applicable to multiple stacked linear spring rate springs.

The controller 26 discussed herein may be a manifold, valves and a process or programmable logic controller. The controller 26 may be connected to the switch so that changing the ride setting on the switch causes the controller to adjust the spring rate and ride frequency of the vehicle.

First and second airbags 12, 14 may be traversed along a longitudinal straight traversal axis. The longitudinal straight traversal axis of the first airbag 12 may be coaxially aligned to a longitudinal straight traversal axis of the second airbag 14.

The suspension system 22 may have an air source. The air source 24 may be a source of pressurized air so that when needed air can be inserted into the first and/or second airbags. The air source 24 can provide the needed pressure to insert air into the airbags 12, 14. The air source 24 may be a pressurizable air tank. It is also contemplated that the air source 24 may be pressurize other gasses as well such an inert gas. The air source 24 may also include a pump which can be used to pressurize the air tank when the pressure of the air tank is not sufficient to insert air into the airbags as needed. The air source 24 may be in fluid communication with the manifold. The manifold may have valves which are controlled by the processor or programmable logic controller.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A spring being adjustable to have first and second different spring rates at a same height for supporting a load at a ride height, the spring comprising:
   a first airbag spring having a first non linear spring rate, the first airbag spring defining a first linear deflection axis wherein the first airbag is traversed along the first linear deflection axis between a first position under a first load and a second position under a second load;
   a second airbag spring stacked on the first airbag spring in series so that both the first and second airbag springs simultaneously compresses as the load increases, the second airbag spring having a second non linear spring rate, the second airbag spring defining a second linear deflection axis wherein the second airbag spring is traversed along the second linear deflection axis between a first position under the first load and a second position under the second load, the first and second linear deflection axes being coaxially aligned;
   an air source for providing compressed air to the first and second airbag springs;
   a manifold in fluid connection with the first and second airbag springs and the air source for providing the compressed air to the first and second airbag springs;
   a plurality of valves inline with the first and second airbag springs for providing the compressed air selectively to the first and second airbag springs;
   a controller connected to the manifold and valves for opening and closing one or more of the plurality of valves for filling and releasing air from the first and second airbag springs,
   wherein a first height of the first airbag spring is different from a first height of the second airbag spring, a second height of the first airbag spring is different from a second height of the second airbag spring, and the first height of the first airbag spring plus the first height of the second airbag is equal to the second height of the first airbag spring plus the second height of the second airbag spring while the ride height remains the same when the first and second airbags are at the first heights and the second heights.

2. The spring of claim 1 wherein at least one valve of the plurality of valves is attached to the manifold and controlled by the controller to allow air to be filled into at least one of the first and second airbag springs to increase a height of the at least one of the first and second airbag springs.

3. The spring of claim 2 wherein the at least one valve releases air from at least one of the first and second airbag springs to decrease a height of the at least one of the first and second airbag springs.

4. A method of operating a spring to have different spring rates with a same height for supporting a load at a ride height, the method comprising the steps of:
   providing a spring, the spring being capable of an adjustable spring rate at the same height so that the spring has a first spring rate at a first height or adjustable to a second spring rate at the first height, the spring comprising:
   a first airbag spring having a first non linear spring rate, the first airbag spring defining a first linear deflection axis wherein the first airbag is traversed along the first linear deflection axis between a first position under a first load and a second position under a second load;
   a second airbag spring stacked on the first airbag spring in series so that both the first and second airbag springs simultaneously compresses as the load increases, the second airbag spring having a second non linear spring rate, the second airbag spring defining a second linear deflection axis, the first and second linear deflection axes being coaxially aligned;
   an air source for providing compressed air to the first and second airbag springs; a manifold in fluid connection with the first and second airbag springs and the air source;
   and a controller connected to the manifold and a plurality of valves for filling and releasing air from the first and second airbag spring;
   filling the first airbag spring and the second airbag spring so that the first airbag spring has a height and the second airbag spring has a height, a height of the first airbag spring being different than a height of the second airbag spring, the height of the first airbag spring plus the height of the second airbag spring having a cumulative height; adjusting an amount of air in the first and second airbag springs to adjust a spring rate of the spring while the cumulative height remains the same,
   wherein the adjusting step fills or releases air from the first and second airbag springs so that a first height of the first airbag spring is different from a first height of the second airbag spring, a second height of the first airbag spring is different from a second height of the second airbag spring, and the first height of the first airbag spring plus the first height of the second airbag is equal to the second height of the first airbag spring plus the second height of the second airbag spring while the ride height remains the same when the first and second airbags are at the first heights and the second heights.

5. The method of claim 4 wherein the filling step is performed by attaching at least one valve of the plurality of valves to the manifold and allowing the at least one valve to be opened and closed by the controller to allow air to be filled into at least one of the first and second airbag springs to increase a height of the at least one of the first and second airbag springs.

6. The method of claim 5 further comprising a step of opening the at least one valve to release air from at least one of the first and second airbag springs to decrease a height of the at least one of the first and second airbag springs.

* * * * *